United States Patent
Beans

[19]
[11] Patent Number: 6,113,151
[45] Date of Patent: Sep. 5, 2000

[54] HIGH PRESSURE QUICK CONNECT AND PRODUCTION PROCESS THEREFOR

[75] Inventor: Bruce A. Beans, Waterford, Mich.

[73] Assignee: ITT Manufacturing Enterprises, Inc., Wilmington, Del.

[21] Appl. No.: 09/014,327

[22] Filed: Jan. 27, 1998

[51] Int. Cl.[7] .................................................. F16L 37/088
[52] U.S. Cl. .......................... 285/23; 285/305; 285/382; 285/321; 285/93
[58] Field of Search ............................. 285/23, 305, 321, 285/382, 334.5, 93; 29/512

[56] References Cited

U.S. PATENT DOCUMENTS

| | | |
|---|---|---|
| 2,749,151 | 6/1956 | Lyons . |
| 3,127,199 | 3/1964 | Roe . |
| 3,278,206 | 10/1966 | Woodling . |
| 3,404,904 | 10/1968 | Roe . |
| 3,534,988 | 10/1970 | Lindsey . |
| 3,635,966 | 1/1972 | Hermann ................................. 285/23 |
| 3,786,730 | 1/1974 | Linderholm . |
| 4,423,891 | 1/1984 | Menges . |
| 4,598,937 | 7/1986 | Sugao . |
| 4,725,081 | 2/1988 | Bauer . |
| 4,779,899 | 10/1988 | Williams ................................. 285/23 |
| 5,178,424 | 1/1993 | Klinger . |
| 5,226,679 | 7/1993 | Klinger . |
| 5,297,818 | 3/1994 | Klinger . |
| 5,335,411 | 8/1994 | Muller et al. . |
| 5,342,095 | 8/1994 | Klinger et al. . |
| 5,374,089 | 12/1994 | Davie et al. . |
| 5,415,443 | 5/1995 | Hayashi . |
| 5,489,127 | 2/1996 | Anglin et al. . |
| 5,492,371 | 2/1996 | Szabo . |
| 5,529,349 | 6/1996 | Gibbs et al. . |
| 5,551,732 | 9/1996 | Bartholomew ...................... 285/321 |
| 5,620,209 | 4/1997 | Sauer ..................................... 285/23 |
| 5,711,549 | 1/1998 | Beans ................................. 285/334.5 |
| 5,718,459 | 2/1998 | Davie et al. ...................... 285/334.5 |
| 5,749,603 | 5/1998 | Mann ..................................... 285/23 |
| 5,820,166 | 10/1998 | Webb ..................................... 285/23 |
| 5,855,399 | 1/1999 | Profunser ............................ 285/321 |
| 5,882,049 | 3/1999 | Beans ................................... 285/321 |

FOREIGN PATENT DOCUMENTS

| | | |
|---|---|---|
| 233336 | 3/1965 | Austria . |
| 2143714 | 3/1973 | Germany . |
| 3739626 | 6/1989 | Germany . |
| 7312793 | 7/1978 | Switzerland ........................... 285/23 |
| 2198798 | 6/1988 | United Kingdom ................... 285/23 |

*Primary Examiner*—Eric K. Nicholson
*Attorney, Agent, or Firm*—Robert P. Seitter

[57] ABSTRACT

A high pressure quick connector is disclosed for use in connecting brake lines of a vehicle, particularly to a brake junction for an anti-lock brake system. The connector includes a housing for receiving a tube retainer. The tube retainer has a lower cylindrical portion that is positively attached to enclose a flared end form to provide a fluid seal. Retaining means in the form of a snap ring works in conjunction with a pop top to provide a low force and a positive insertion indicator. The snap ring has ears that are compressed together and inserted up inside a slot in the pop top. Upon installation of the tube retainer and retaining means into a central bore of the housing, an end portion of the housing makes contact with the pop top so that the pop top slides up the tube. As the pop top slides up the tube, the snap ring ears are released from the pop top slot. The snap ring expands upon release into a final latching position with the housing and tube retainer. The tube retainer, snap ring, pop top and seal are pre-assembled and protected by a transport cover prior to final assembly and installation in the end product.

17 Claims, 9 Drawing Sheets

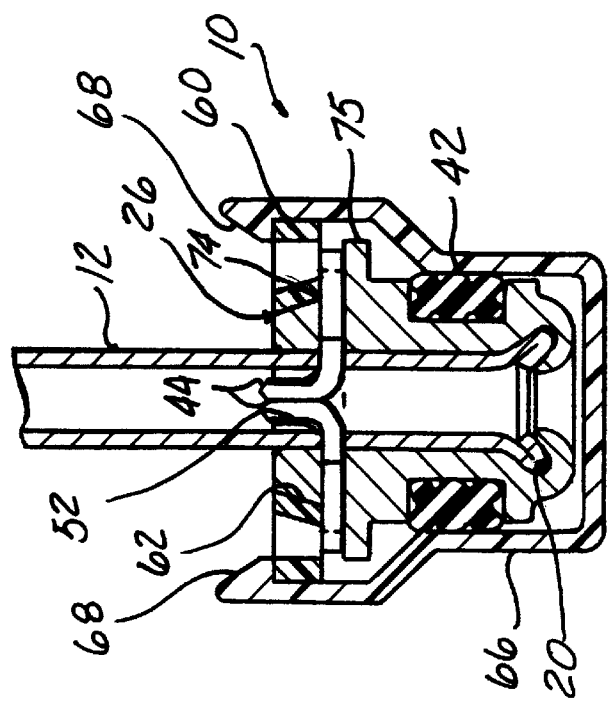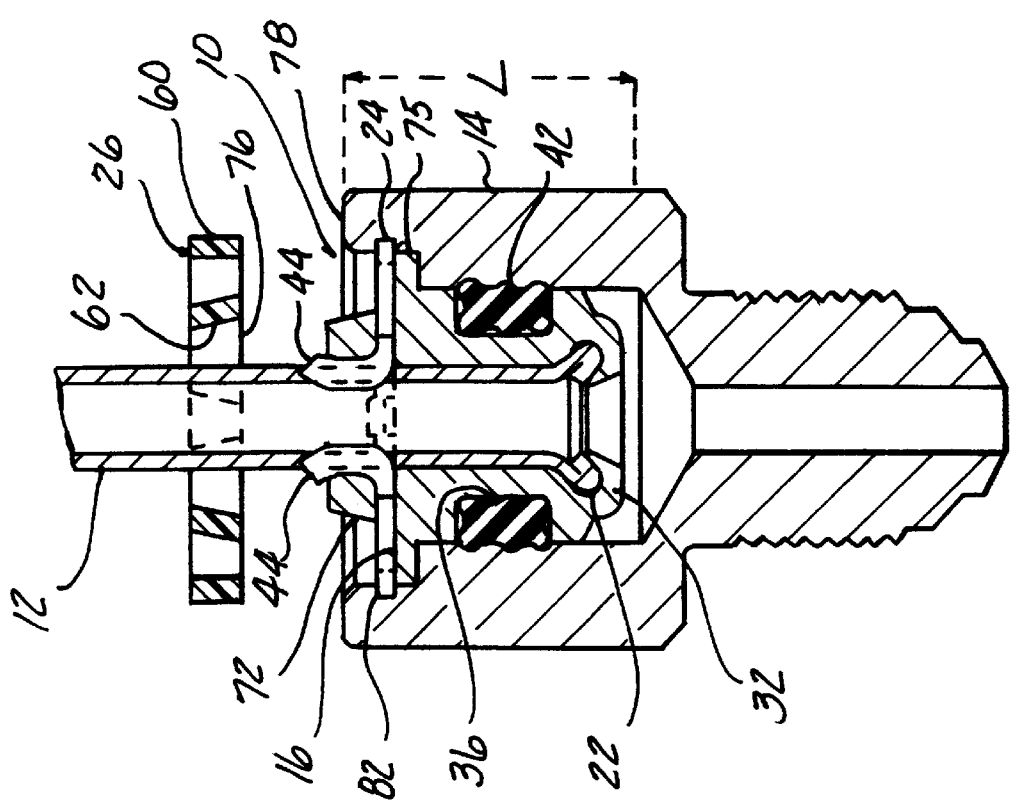

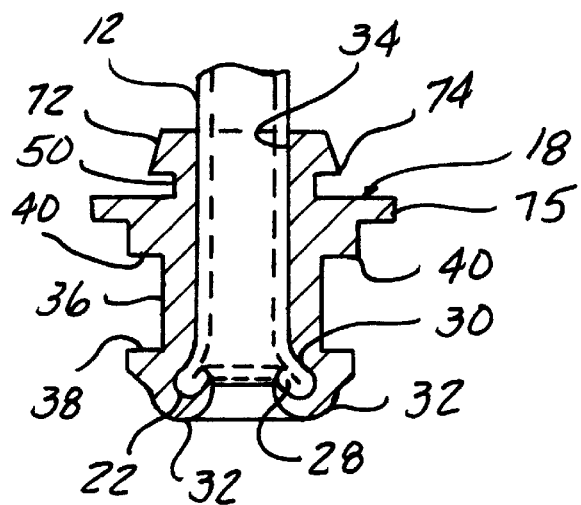
FIG·3
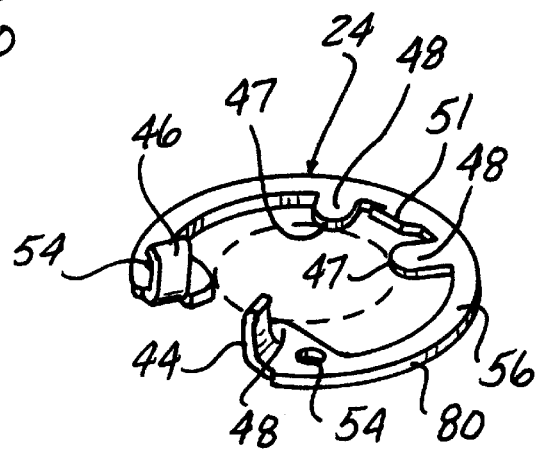
FIG·4
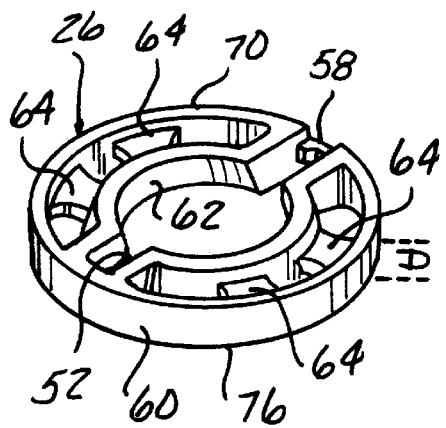
FIG·5
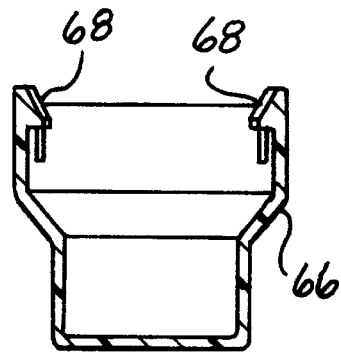
FIG·6
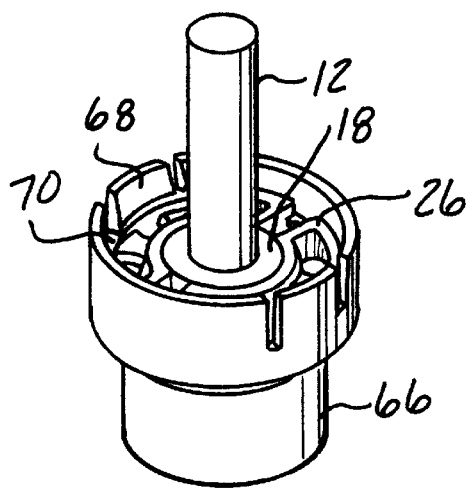
FIG·7

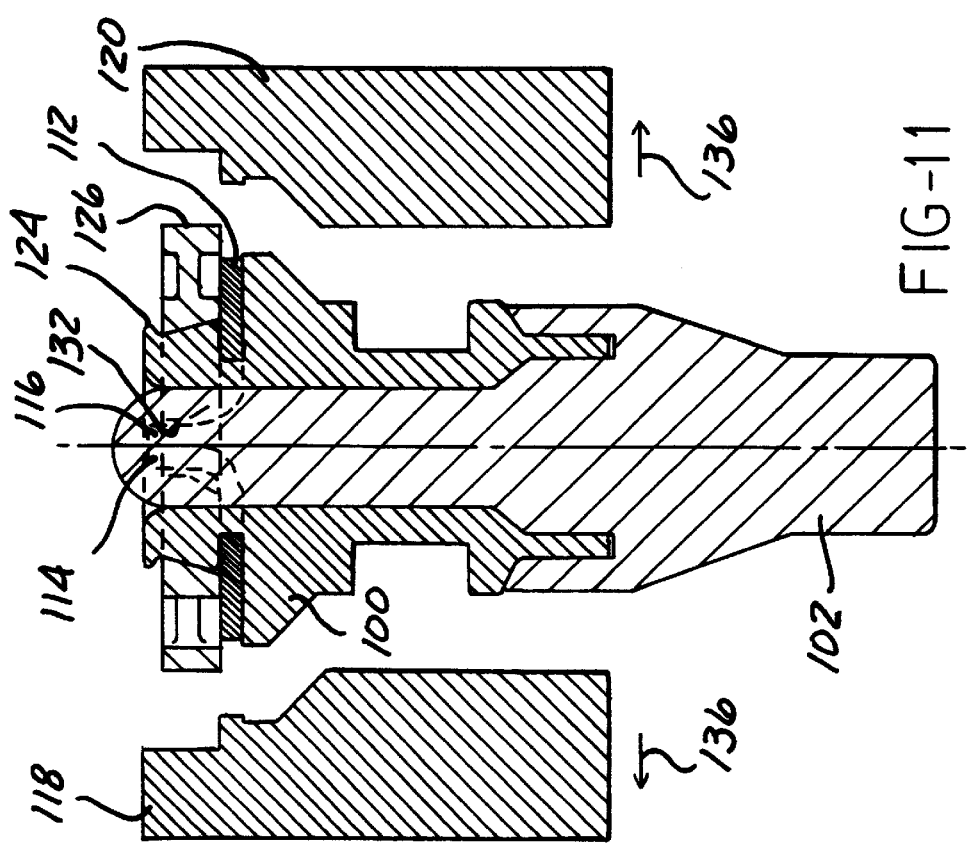
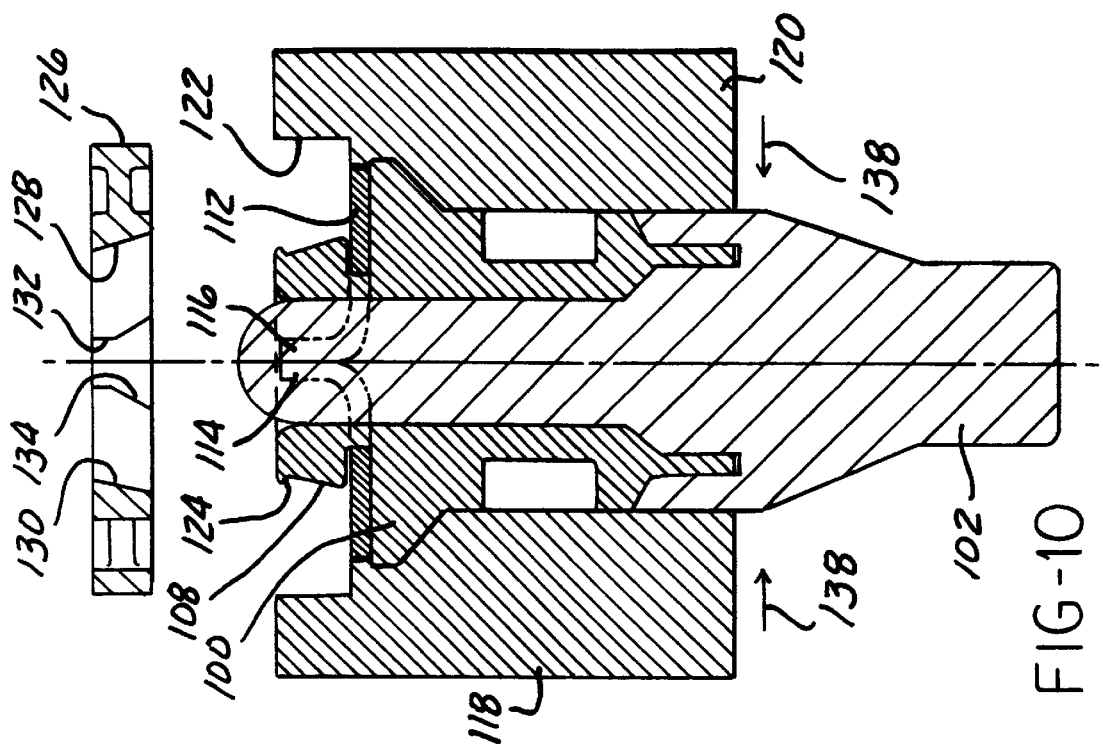

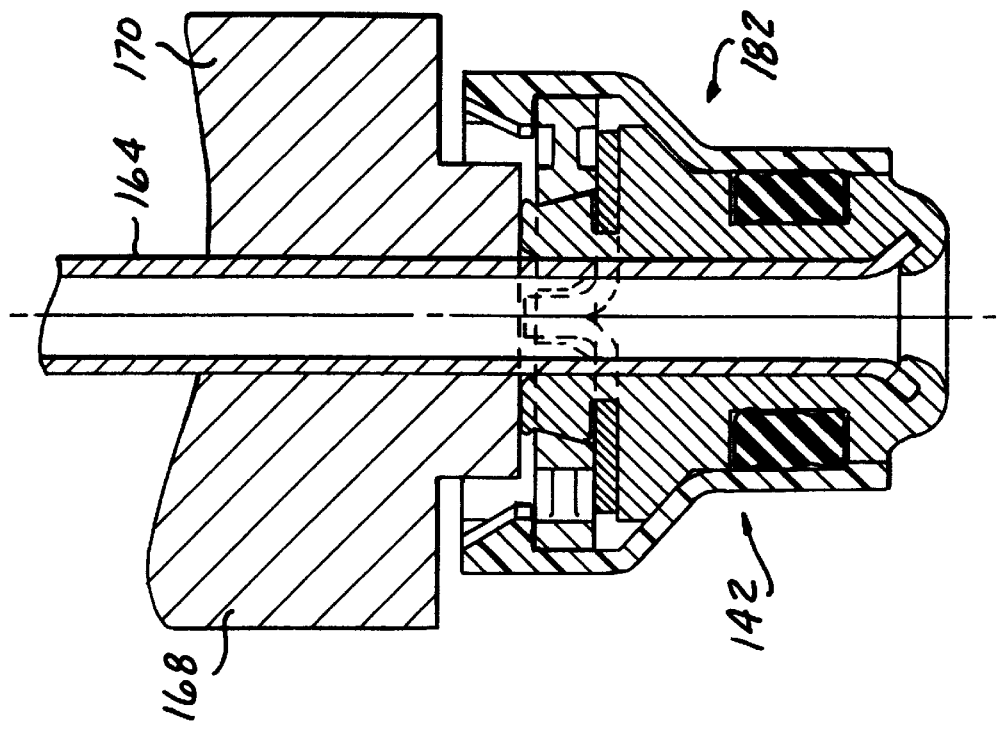
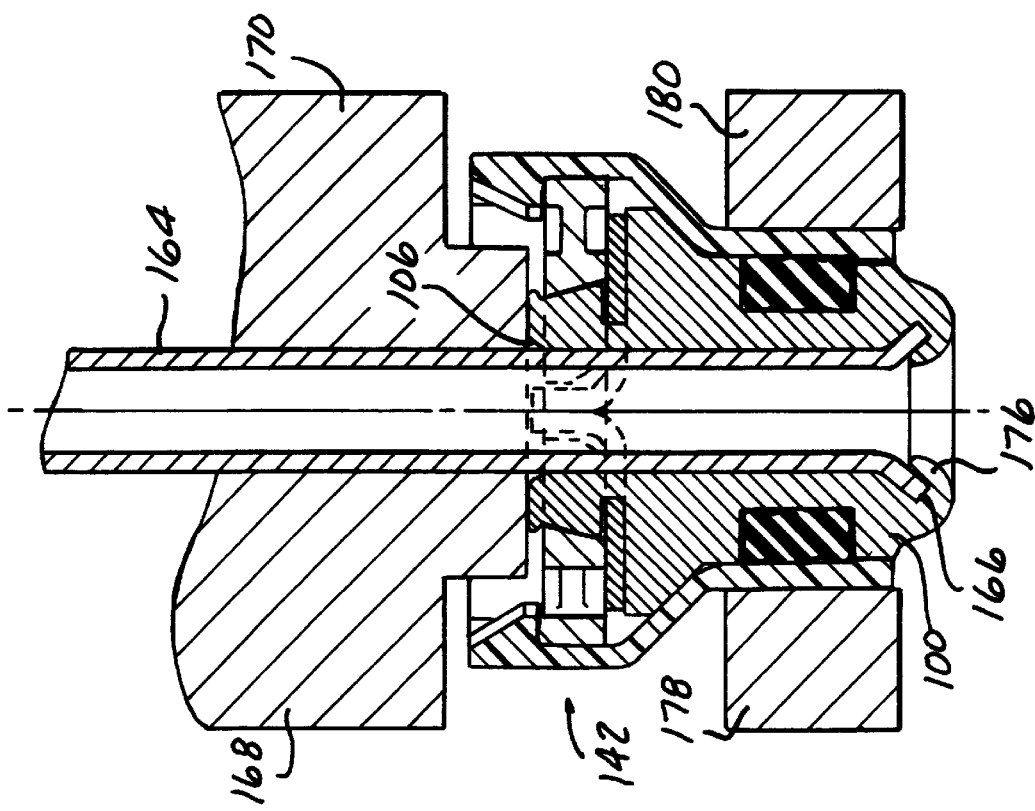

HIGH PRESSURE QUICK CONNECT AND PRODUCTION PROCESS THEREFOR

FIELD OF THE INVENTION

The present invention relates to a high pressure snap fit or quick connector employed on fluid conduit systems and more particularly for vehicle brake lines.

BACKGROUND OF THE INVENTION

Snap fit or quick connectors have been found to be useful in a wide range of applications. In particular, they are frequently employed for joining fluid carrying conduits in automotive and industrial applications. Such connectors have found general acceptance as they are typically capable of being closed in a single uni-axial movement which facilitates automated assembly, and entail simple designs which are relatively inexpensive to produce.

A further advantage of quick connect fittings is that they provide an effective seal for handling volatile or hazardous fluids, such as gasoline, while permitting ease of disassembly and reassembly during repair of a host system.

In applications where hazardous material is to flow through a fitting, for example, in vehicle brake lines, prevention of inadvertent release of the quick connector is of primary concern. Accordingly, relatively high axial pull apart strength specifications are mandated. In addition, low insertion forces are required.

Currently, for many high pressure applications, such as with brake lines, threaded fittings are used as connection means. If not aligned correctly, cross threading may result. If excessive torque is applied, over threading may result. As a result of cross-threading or overthreading, the threads are stripped and the material must be scrapped and replaced.

In current anti-lock brake systems, the brake lines are connected to a brake manifold or junction during the assembly process of the vehicle. The threaded connections of the prior art are located close together which increases assembly time and labor as well as the potential for error.

Therefore, it is desirable of the invention to provide a quick connect for high pressure automotive system applications and particularly for brake systems which facilitate assembly of the quick connect so that it is easier and quicker. It is also desirable to provide a quick connector for high pressure fluids that provides high axial pull apart strength and low insertion force specifications. It is further desirable to provide a connector that eliminates the threaded connection to reduce scrap as a result of cross-threading. In addition, it is desirable to provide a connector in a compact package such that the current tube nuts can be replaced with a quick connector so that six brake lines can have connection points on a single brake manifold. It is finally desirable of this invention to provide an improved quick connect having a positive seal around the brake line end, and which provides minimum volumetric displacement, low diametrical clearances and sealing durability.

A further disadvantage typical of prior art high pressure quick connectors is that they must be assembled with an associated tube and shipped to a final destination as a single assembly. Such shipment is expensive and subjects the connectors to damage from mishandling. Such designs frequently require the presence of a resilient seal between the outer peripheral surface of the tube and a mating bore which can result in leakage. This is a particular problem with multi-layer, high pressure steel tube typically used in automotive brake lines. Finally, it is difficult to perform in-process leak checks prior to final installation and very expensive to correct leaks after final installation.

SUMMARY OF THE INVENTION

The present invention overcomes many of the shortcomings of the prior art described hereinabove by providing for the preassembly of dimension critical subcomponents of the male portion of a quick connector assembly, and is especially well suited for high pressure applications. Specifically, the present invention includes a male fitting body which is adapted for sealing interconnection with a tube end form for use in high pressure fluid quick connectors, the male fitting body comprising a tube retainer which has a central aperture for receiving a tube, a latch in assembly with the retainer which is resiliently displaceable between a released position and a clasped position, and a retainer which maintains the latch in the clasped position prior to installation of a tube in the central aperture. This arrangement has the advantage of allowing preasseembly of the male fitting body at a time and location independent of its mating with the tube, shipment, and mating with the female portion of the quick connector during the final or end application assembly process. Furthermore, final assembly steps following mating of the male fitting body with the tube can be accomplished largely by hand, without the use of expensive tools.

The inventive method of the present invention relates to the construction of a male connector assembly for a high pressure quick connector including the steps of preassembling a male fitting body consisting of at least a tube retainer, a latch which is resiliently displaceable between a released position and a clasped position and a retainer which maintains the latch in its clasped position, and a subsequent step of affixing the male fitting body to the end of an elongated tube.

Another aspect of the present invention includes installing a seal and a protective transport cover as part of the preassembly of the male fitting body.

This assures that the male fitting body assembly can be bulk shipped and arrive at its interim destination intact and clean.

According to yet another aspect of the present invention, the male fitting body is affixed to the tube and pressure tested with the transport cover in place. Subsequently, a second protective end cover can be applied to the male connector assembly for shipment to the final destination. This arrangement permits detection of any manufacturing errors at an early stay of production prior to final installation.

The present invention addresses the aforementioned concerns and provides a connector which has a high pull out force, exceeding 500 pounds at a rate of 50.8 mm/min., while having a low insertion force not exceeding 25 pounds. The present invention further provides a quick connector that is sized to replace the current tube nuts for a brake manifold. The quick connector of the present invention provides a male connector and a female connector. The male connector has a locking and retaining assembly that receives a brake line having a flared end portion. The retaining means provides a groove for receiving and securing a locking means once the locking means is installed on the retaining means. The retaining means further by its formation of its lower portion over and enclosing the flared end of the brake line provides a positive attachment to the brake line as well as a fluid seal.

The locking means in the form of a snap ring having longitudinally extending ears works in conjunction with a pop top such that the male connector assembly can be delivered to the assembly facility in a protective cover, wherein the snap ring ears are compressed together and are inserted upward inside a slot within the pop top. Upon delivery, the protective cover is removed and the male quick connect assembly is inserted into a receiving bore of the female connector. During insertion into the receiving bore, the pop top makes contact with an outer surface of the female connector. As the male quick connect assembly is further inserted, the pop top is forced to move longitudinally up the brake line tube as it is separated from the snap ring. As the pop top is separated from the snap ring, the snap ring ears slide out of the slot in the pop top, and the snap ring expands into the annular channel of the receiving bore. The annular channel has a dimension to correspond with the height of the snap ring such that when the snap ring is released in the annular channel, axial movement of the male connection in the receiving bore is essentially eliminated.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1, is a cross-sectional view of the preferred embodiment of a male high pressure quick connect inserted in a female connector;

FIG. 2, is a cross-sectional view of the male quick connect assembly configuration for transport to a vehicle assembly facility;

FIG. 3, is a cross-sectional view of a retaining means formed over a brake line end form;

FIG. 4, is a perspective view of a snap ring retainer;

FIG. 5, is a perspective view of a pop top;

FIG. 6, is a cross-sectional view of a delivery cover;

FIG. 7, is a perspective view of the male quick connect assembly configuration for transport.

DESCRIPTION OF THE PREFERRED AND ALTERNATIVE EMBODIMENTS

Figure 9:
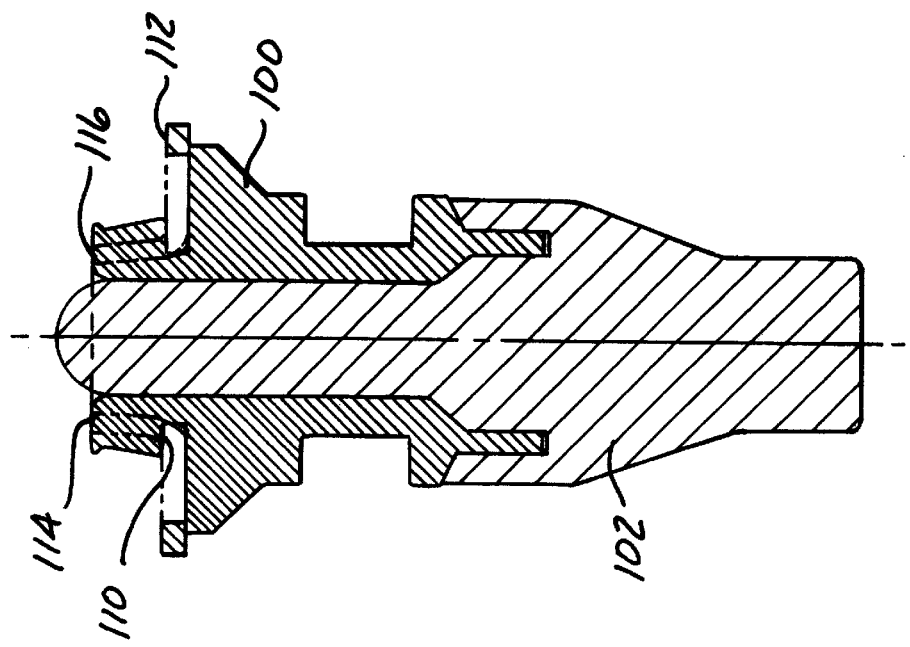

Looking first at FIGS. 1 and 2, the invention provides a quick connector adapted for connecting a male connector assembly 10 incorporating a tube 12, especially a brake line tube, to a female connector generally indicated at 14. The female connector or housing 14 may have any applicable exterior configuration depending upon the application. FIG. 1 shows a typical housing 14 for an in-line brake tube. The housing 14 has an internal surface defining a receiving bore 16 for the male quick connector 10. The external configuration of the housing may change relative to the application. In an antilock brake system, brake lines may be connected to a housing in the form of a brake manifold or junction having multiple receiving bores 16 therein. The male quick connector and housing are not limited to the anti-lock brake system but may be used for any high pressure connection.

The male quick connector 10 includes a tube retainer 18 having a positive attachment 20 to the flared line or endform 22 of the brake line 12. The tube retainer 18 is locked in place in the receiving bore 16 by a latching means such as a snap ring 24. A retainer such as a pop top 26 works in conjunction with the snap ring 24, as will be discussed in detail below. The pop top 26 and snap ring 24 allow for a low characteristic insertion force into the receiving bore 16 of connector housing 14.

FIG. 3 shows a cross-sectional view of the tube retainer 18 formed over a brake line endform 22. The tube retainer 18 has a body 33 defining a through aperture 34 through which tube or brake line 12 passes. The end of the brake line tube 12 is flared to a standard 45E SAE J533B flare. A cylindrical lower half 28 of the end portion 22 of the flare is upturned into the tube 12 so that the lower half 28 lays flush against the upper half 30 of the flared end 22. The tube retainer 18 is positively attached to the brake line 12 by forming its lower cylindrical portion 32 over the flared end 22 of the brake line 12. This configuration provides a fluid tight seal that is held securely to the tube 12 in that the flared end 22 in the brake line 12 is sandwiched by the lower cylindrical portion 32 of the tube retainer 18 in the forming process. The end inner diameter of the male connector 10 at the bottommost position of through aperture 34 is essentially the same as the mean diameter of the tube 12 in order to not restrict flow. The brake line tube 12 is supported and is in contact with the tube retainer 18 for approximately 10 millimeters (mm) by the inner periphery of the tube retainer defining the inner through aperture 34 to provide durability and stability from vibration loads. At a lower portion of the tube retainer 18, an exterior surface portion forms a circumferential integral recess 36 disposed between a lower ledge 38 and an upper shelf 40. The circumferential recess 36 provides a position for another sealing means 42 as illustrated in FIGS. 1 and 2. The sealing means 42 may include an O-ring, but preferably is a Quad-O-Dyne seal ring registered and manufactured by Minnesota Rubber, to provide a durable and redundant seal between the housing female connector and male connector. The seal ring 42 is made from an EPDM material compound, i.e. Ethylene Propylene Diene Monomer. An upper periphery 72 of the tube retainer 18 is tapered outwardly, terminating at a ledge 74. Adjacent to ledge 74, the outer periphery of the tube retainer 18 forms a groove 50. Adjacent the groove, and moving longitudinally away from ledge 74 is an extending ledge 75 having a greater diameter than ledge 74.

FIG. 4 shows a perspective view of the latching or locking mechanism 24 for the male quick connector 10. The latching mechanism 24 is in the form of a snap ring 24. The snap ring 24 is a stainless steel noncontiguous ring to allow for radial compression and radial expansion at the two ends. At each end is a longitudinally extending ear 44 having a curved vertical wall 46. The ears 44 on the snap ring 24 are used in conjunction with the pop top 26 shown in FIG. 5. The ears 44 simplify the latching and unlatching of the male connector 10 through the use of simple tools. Also, adjacent each ear 44 on the snap ring 24 is an aperture 54 through the upper surface 56 to provide a means to use standard snap ring pliers to latch and unlatch the quick connector 10. The snap ring 24 is held in compression so that the ears can be inserted inside the slot 52 in the pop top 26. Adjacent to each ear 44 and diametrically opposing the ears 44 on snap ring 24 are radially inwardly facing tabs 48 to provide engagement with the groove 50 of the tube retainer 18. The upper periphery 72 of tube retainer 18 is tapered outwardly to provide a smooth transitional path for the snap ring 24 as the snap ring 24 is being inserted over the tapered periphery 72 onto the tube retainer 18 for positioning in groove 50 and to prevent snap ring 24 from slipping out of groove 50 once installed.

The innermost surface 47 of the spaced tabs 48 define a circle having a smaller diameter than the diameter of ledge 74. Tabs 48 center the snap ring about the tube retainer 18 in groove 50 when the snap ring 24 is in a compressed or clasped position as shown in FIG. 2. Snap ring 24 further includes an upwardly angled tab 51. When the male connector 10 is being removed from the housing 14 for service, angled tab 51 retains the snap ring 24 within groove 50 so that snap ring 24 cannot fall off retainer 18 when unlatched for service.

The pop top 26 (FIG. 5) has a ring shaped configuration having a depth D slightly smaller than the height of the ears 44 of snap ring 24 so that the ears 44 are accessible by the conventional tools. A slot 52 is formed along an inner peripheral wall extending the entire depth D of pop top 26 for receiving ears 44. The compressed ears 44 positioned in slot 52 allows for an insertion load of the male connector 10 into the receiving bore 16 of a force not exceeding 25 lbs. At the opposing side of the pop top 26 from the slot 52 is a breakable link 58 for purposes discussed further. The remaining portions of the pop top 26 comprise an outer ring 60 and a tapered concentric inner ring 62 having interconnecting flanges 64 therebetween. This configuration provides a structurally durable pop top 26 with minimal material. The material used for pop top 26 is preferably a 40% talc filled polypropylene.

FIGS. 2 and 7 show the male connector assembly 10 in its shipping condition to the assembly destination. For shipping, a delivery cover 66, as shown also in FIG. 6 is provided and installed on the male quick connector 10 over the flared endform 22 for protection to the brake line end 22 and cleanliness during shipment. The cover 66 has angularly inwardly directed flanges 68 that grip an upper surface 70 of the pop top 26. Angularly inwardly directed flanges 68 are essentially located 180° from each other on the delivery cover 66. The delivery cover 66 is also preferably manufactured from 40% talc filled polypropylene.

Upon installation at its assembly point on the vehicle, the delivery cover 66 is removed and the male quick connector 10 is inserted into a receiving bore 16 of the housing 14. As the male connector 10 is being inserted into the receiving bore 16, a lower surface 76 of pop top 26 makes contact with an upper surface 78 of the housing 14. As the male quick connector 10 is inserted further into the receiving bore 16 of housing 14 the pop top 26 moves longitudinally up tube 12 in response to the force of upper surface 78 against the pop top 26. The pop top 26 provides a positive indicator that the male connector 10 is coupled to female connector 14. The pop top 26 may selectively remain on the brake tube 12 or can easily be snapped at the breakable link 58 and removed from tube 12.

The snap ring ears 44 slide out of slot 52 in response to the movement of the pop top 26. The ears 44 of the snap ring 24 are released from slot 52 in pop top 26 approximately 0.5 mm from the final latching position, wherein the outer periphery 80 of the snap ring 24 moves into a radial groove 82 formed in the surface of the receiving bore 16. The height dimension of the radial groove 82 coincides with the thickness dimension of outer periphery 80 so that snap ring 24 is secured tightly within radial groove 82 and there is essentially no axial movement of the male connector 10 in the receiving bore 16. In addition, by minimizing axial movement, systemic volumetric changes as a result of relative displacement of the connection of the male connector 10 and female connector 14 is also minimized. When snap ring 24 is released by the pop top 26 and positioned in groove 82, extending ledge 75 provides a tight diametric clearance for strength holding capability of snap ring 24. The configuration of snap ring 24 positioned in groove 82 requires a retainer pull load exceeding 500 lbs to remove the male connector 10 from female connector 14.

In FIG. 1, the male connector assembly 10 is received within the receiving bore 16 of a female connector housing 14. It is understood that the housing 14 may be any connector means having a receiving bore configured with the mating surfaces and bore dimensions as shown for the proper function of the male quick connect 10. In particular, it is the intent of the inventor to provide a quick connector that is sized to replace existing tube nuts currently being used for coupling a brake line to a brake junction such as used in current brake systems. Therefore, the invention provides a male connector designed to operate with a 3/16 inch and 6 mm brake tube and having an overall length (L) of 13.6 mm.

Further details regarding the operation and configuration of the pop top 26 with respect to the assembly can be obtained from U.S. Pat. No. 5,711,549, issued Jan. 27, 1998 to the inventor Bruce A. Beans for a "High Pressure Quick Connect for use in Automotive Brake System Applications" which is incorporated by reference herein in its entirety.

Further details regarding the operation and configuration of an alternative embodiment of snap ring 24 with respect to the assembly can be obtained from U.S. Pat. No. 5,882,048, issued Mar. 16, 1999 to the inventor Bruce A. Beans for a "High Pressure Quick Connect Design with Reduced Volumetric Displacement and Piloted Snap Ring" which is incorporated by reference herein in its entirety.

The present invention is particularly well suited to be manufactured and assembled in such a manner that the male connector assembly 10 can be initially produced as a subassembly containing most of the dimension critical and/or easily damaged components. The subassembly can subsequently be attached to an associated tube such as automotive brake lines at a different time and location. Thereafter, the assembled tube and male connector assembly can be reshipped to the end user for installation in the host system.

Figure 8:
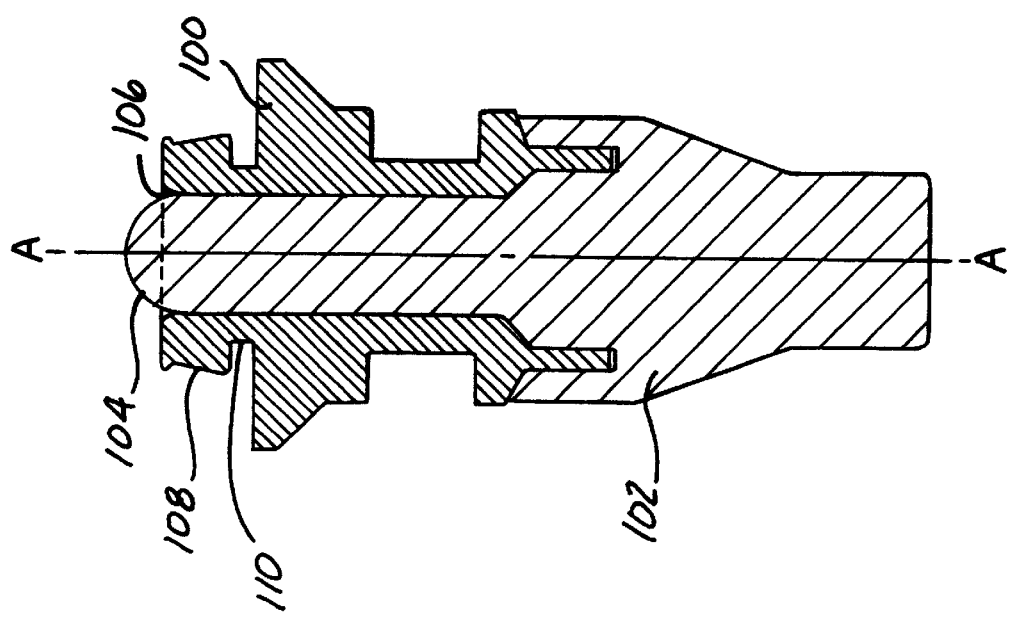
FIGS. 8 through illustrate a succession of manufacturing work stations involving the assembly of an alternative design male portion of a high pressure quick connect.
Figure 13:
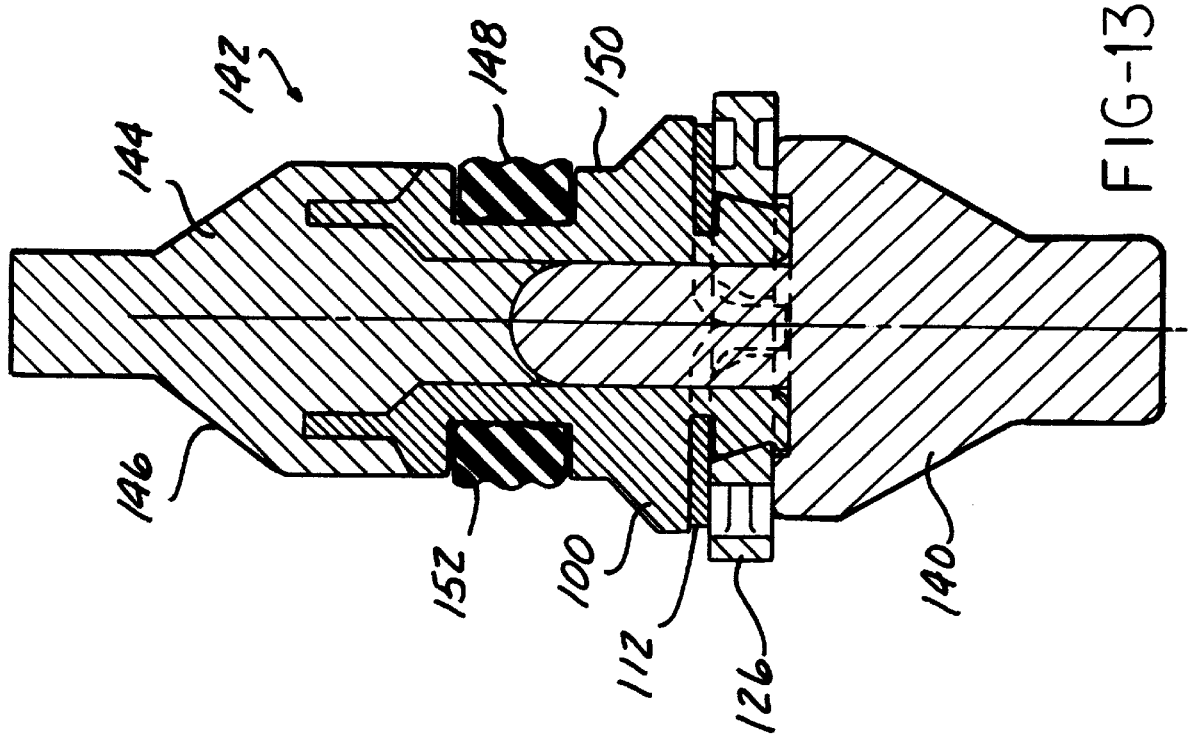

FIGS. 8 through 21 illustrate, in a step-by-step basis, the detailed sequence of the assembly process. It is to be understood that the present invention is not limited to the specific sequence of steps illustrated. Rather, FIGS. 8 through 21 are an example of one way to produce an inventive connector and employ an inventive production process. FIGS. 8 though 14 illustrate a secession of steps for producing a male connector assembly 182 which is of somewhat alternate design to that described with respect to drawing FIGS. 1 through 7. However, for the sake of brevity, only the features of the alternative embodiment male connector assembly 182 described in FIGS. 8 through 14 will be elaborated upon. The other features not specifically described are substantially common to those described with respect to FIGS. 1 through 7. Lastly, FIGS. 15 through 21 illustrate exemplary process steps for mating a male connector assembly with a tube.

Referring to FIG. 8, a tube retainer 100 is held by a fixture 102 having a pin 104 extending upwardly through a receiving bore 106 in tube retainer 100 to precisely locate tube retainer 100 about a central axis A—A. The uppermost portion of tube retainer 100 defines a tapered upper periphery 108 terminating at an under cut formed by a radially outwardly opening annular groove 110. A number of fixtures 102 are mounted to automated assembly equipment (not shown) for sequential movement between various work stations.

Referring to FIG. 9, when fixture 102 moves to the next work station as illustrated, a snap ring 112 is applied thereto by axially downwardly ramping along upper periphery 108 until its tabs 48 (as illustrated in FIG. 4) register with annular grove 110. Snap ring 112 is substantially identical to snap ring 24, also referred to herein as latching means as illustrated and described with respect to the embodiment of FIGS. 1 through 7.

As illustrated in FIG. 9, snap ring 112 is in its released position with its longitudinally extending ears 114 and 116 in a spaced apart relationship. Although not illustrated in FIG. 9, the integral tabs 48 of snap ring 112 are trapped within annular groove 110.

Referring to FIG. 10, after fixture 102 moves to the next station, dies 118 and 120, close radially upon tube retainer 100 as indicated by arrows 138 thereby radially compressing snap ring 112 from its released position, as illustrated in FIG. 9, to its clasped position illustrated in FIG. 10 with ears 114 and 116 in an abutting relationship. Dies 118 and 120 have a recess 122 formed in the uppermost surface thereof to expose the upper periphery 108 of tube retainer 100. The uppermost end of upper periphery 108 has a radially outwardly circumferentially extending bead 124 integrally formed therein.

With snap ring 112 in the clasped position, a retainer, such as a pop top 126, similar to pop top 26 described with respect to FIG. 5, is axially downwardly applied upon tube retainer 100. Pop top 126 is generally annular in shape defining a central throughbore 128 having a radially narrowing inwardly facing surface 130. The minimal diameter of bore 128 is slightly less than the outside surface diameter of bead 124. One location about the circumference of surface of 130 defines an axially extending radially inwardly opening recess 132 which, in FIG. 10, is rotationally indexed with and dimensioned to be just slightly greater than the circumferential width of the combined ears 114 and 116 of snap ring 112. The leading or bottom edge of recess 132 is formed with an opening taper 134 to ensure registration of recess 132 with ears 114 and 116. As pop top 126 is axially downwardly applied upon tube retainer 100, surface 130 of pop top 126 will ramp along bead 124, momentarily expanding pop top 126 to permit pop top 126 to self-engage tube retainer 100.

Referring to FIG. 11, after pop top 126 is snap-fit over bead 124 to the position illustrated in FIG. 11, ears 114 and 116 are disposed within recess 132 and snap ring 112 is retained in its illustrated clasped position. At that point, dies 118 and 120 are radially removed from tube retainer 100 as illustrated by arrows 136.

Figure 12:
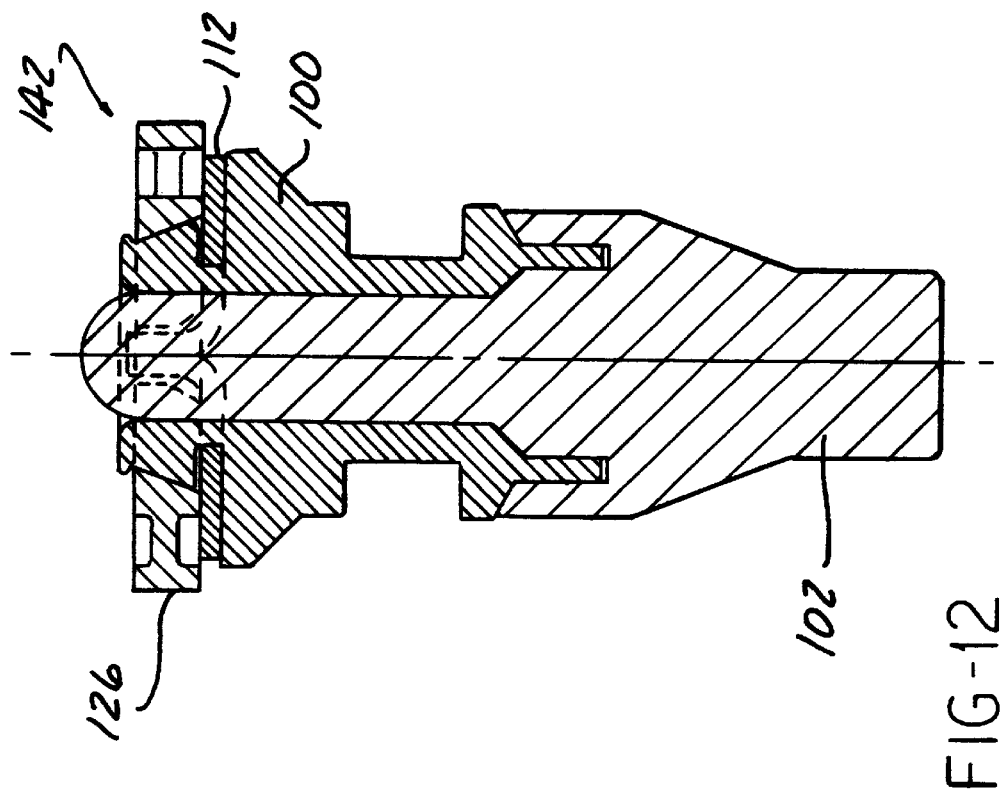

Once dies 118 and 120 are removed, fixture 102 is moved to the next work station as illustrated in FIG. 12 wherein the subassembly of tube retainer 100, snap ring 112 and pop top 126, referred to as a male fitting body 142 is suitably cleaned and dryed. Thereafter, the male fitting body 142 is removed axially from fixture 102, inverted and applied to a new fixture 140 at the next work station. A complementary second fixture 144 is then axially placed over male fitting body 142 to momentarily hold it in its illustrated position. Fixture 144 has an external ramped surface 146. A annular rubber seal 148, such as seal 42 described in connection with the embodiment of FIGS. 1 through 7 is pre-lubricated and expanded by positioning it concentrically above fixture 144 and pressing it axially downwardly over ramping surface 146. As the seal 148 is pressed further downwardly over the outer peripheral surface 150 of tube retainer 100, it registers with an axially elongated, generally rectangular, radially outwardly opening annular recess 152 formed in the outer surface 150 of tube retainer 100 and resiliently retracts thereinto.

Figure 14:
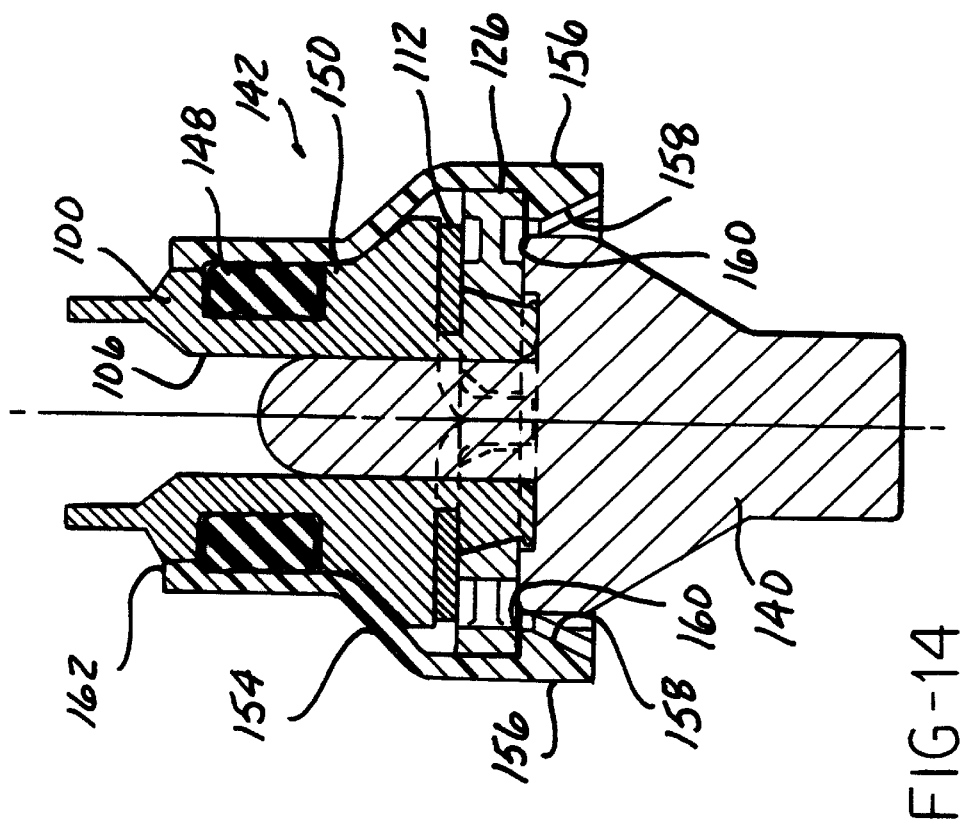

Fixture 144 is then axially removed and fixture 140 is moved to the next work station as illustrated in FIG. 14. A generally cylindrical protective delivery or transport cover 154 is slip fit axially downwardly to substantially cover the entire outer peripheral surface 150 of tube retainer 100 as well as seal 148 and the exposed outer circumferential surfaces of snap ring 112 and pop top 126. Two circumferentially opposed fingers 156 extend axially downwardly beyond transport cover 154. Fingers 156 are integrally formed with cover 154, each defining an inwardly extending ramped tab 158, each having a trailing abutment surface 160 which snaps over the bottom most surface of pop top 126 to self-engage therewith. Transport cover 154 is formed of inexpensive material which is robust enough to protect the male fitting body 142 during its subsequent handling but is resilient enough to permit manual removal therefrom upon final installation of the male fitting body 142 by radial deformation of fingers 156. The uppermost end 162 of cover 154 is open to permit a portion of tube retainer 100 to extend therefrom. At this point, male fitting body 142 is complete and is removed from fixture 140 in anticipation of shipment to the locale where it will be mated with an associated tube. As constituted in FIG. 14, male fitting body 142 contains all of the dimensional critical and/or easily damaged components packaged in a single compact, protected robust configuration suitable for bulk shipment.

Figure 15:
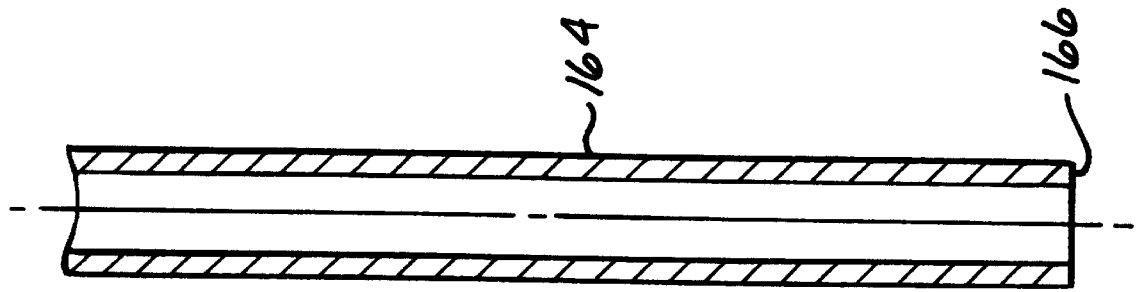

Referring to FIG. 15, when male fitting body 142 is to be mated with a tube 164, an appropriate length of tube 164, having an open end 166 which has been cleaned and deburred, is placed on an automated tube shuttle system (not shown).

Figure 16:
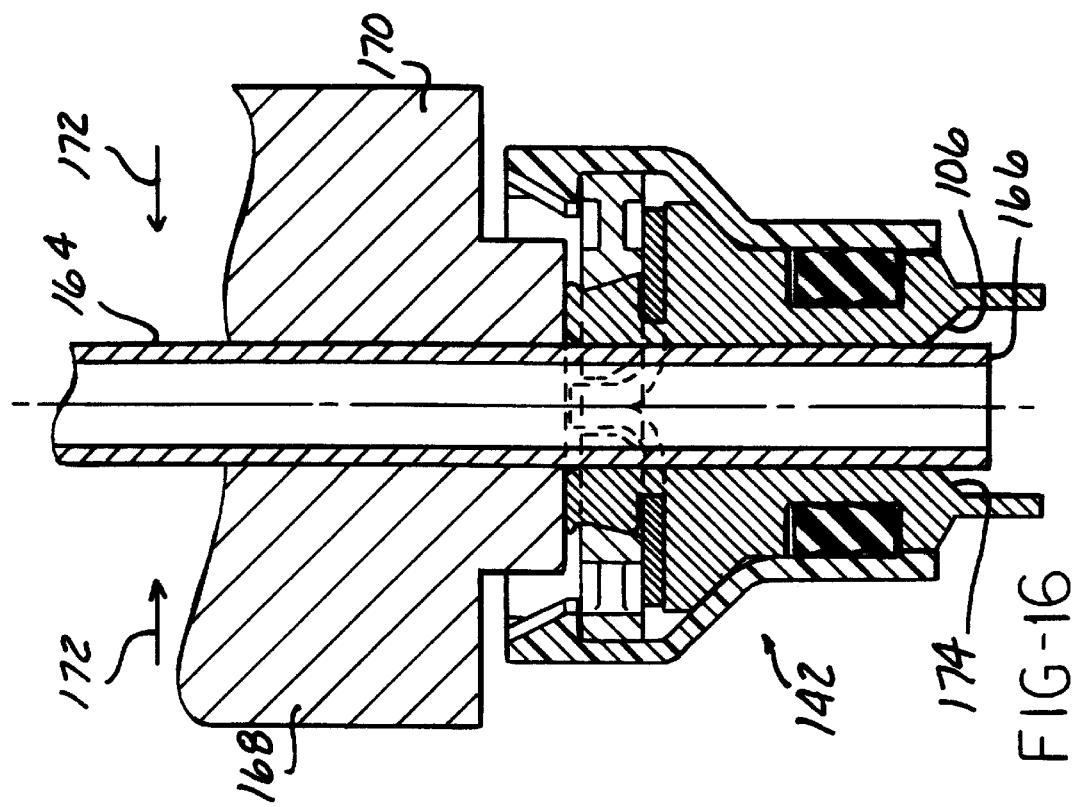

Referring to FIG. 16, tube 164 is grasped by holding dies 168 and 170 as indicated by arrows 172 with the open end 166 of tube 164 extending downwardly from dies 168 and 170. Male fitting body 142 is thereafter mated with tube 164 by press fitting tube end 166 through receiving bore 106. Tube end 166 extends entirely through bore 106 and projects slightly outwardly (downwardly) therefrom, a dimension corresponding with that of a tapered surface 174 defined by bore 106 to establish a region of increased diameter at the lowermost opening of bore 106.

Figure 17:
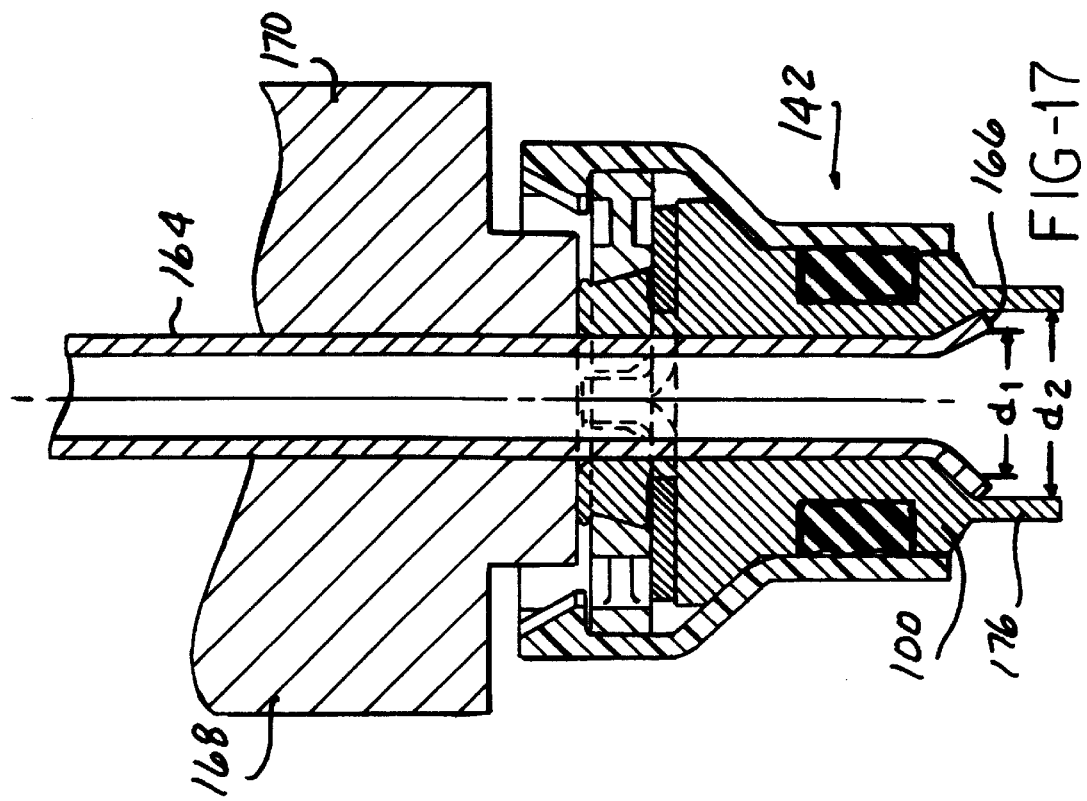

Referring to FIG. 17, die set 168 and 170 is then transferred to the next work station at which end 166 of tube 164 is flared outwardly wherein the outer circumferential surface of end 166 of tube 164 abuts tapered surface 174 of tube retainer 100. The flaring follows the industry rule of approximately but not exceeding 30% of base tube diameter expansion, that is, the nominal original diameter of tube 164 being $d_1$, the maximum diameter of the flared end 166 is $d_2$ where in $d_2$ is equal to 1.3 $d_1$.

An annular skirt portion 176 is integrally formed with and extends axially downwardly from the lowermost portion of tube retainer 100. Skirt 176 is positioned concentrically with receiving bore 106. The embodiment of FIG. 17 illustrates a simple flare which is preferred for the present intended application. However, if a SAE type flare, as illustrated in FIGS. 1 through 3 is desired, additional process steps at workstation 17 would be required as should be apparent to one of ordinary skill in the art.

Referring to FIG. 18, dies 168 and 170 containing tube 164 and male fitting body 142 are then transferred to the next work station at which a radial forming machine roll forms the bottom of the retainer 100 over the end form of tube end 166 by plastically deforming skirt 176 so that it clamps both sides of tubing end 166 to establish an extremely robust mechanical connection and simultaneously establish a fluid tight seal between the outer circumferential surface of tube 164 and bore 106 of tube retainer 100. Because of the presence of rubber/plastic components which are temperature intolerant, a cold working process is preferably employed to effect the roll forming. During the roll forming, a supplemental pair of securing dyes 178 and 180 may be employed for additional stability of the work piece. Following the roll forming process, dyes 178 and 180 are removed.

Referring to FIG. 19, dies 168 and 170, tube 164 and male fitting body 142 are then transferred to the next work station for cleaning and drying as required. At this point, the male quick connector assembly 182 consisting of tubing 164 and male fitting body 142 is complete.

Figure 20:
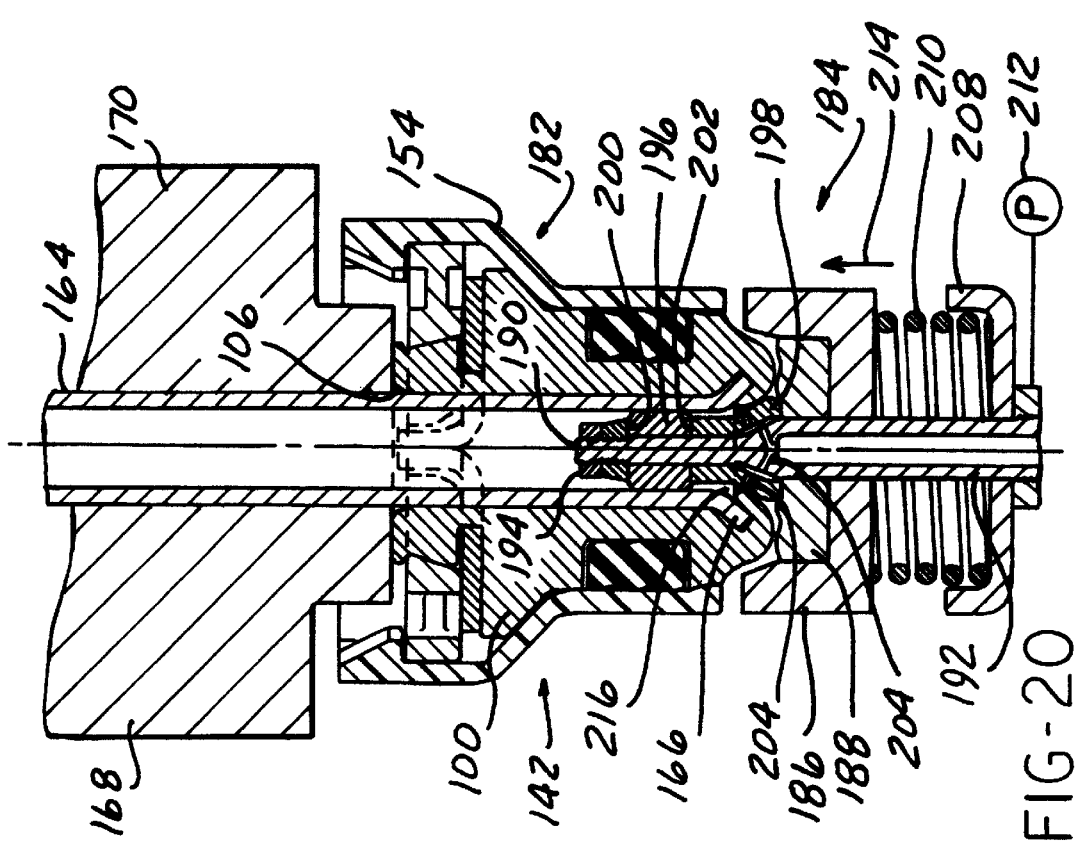

Referring to FIG. 20, after dies 168 and 170 and the male quick connector assembly 182 are transferred to the next work station, a pressure check fixture 184 is employed to pressure test the radial form to the tube seal at 10 and 150 psi to ensure integrity of the seal between the outer circumferential surface of the tube 164 and the receiving bore 106 of tube retainer 100. The present invention permits checking of the sealing integrity of 100% of connector assemblies produced 182 without adversely effecting production cycle times. Fixture 184 permits localized pressure testing at the end 166 of tube 164 without the need to pressurize the entire trapped volume within tube 164.

Check fixture 184 includes a rigid frame 186 which nesting receives a resilient rubber sealing pad 188. An elongated control rod 192 extends axially through registering openings in frame 186 and sealing pad 188, transitioning at its uppermost end into an elongated pintle 190. A closure fastener 194 is attached to the uppermost end of pintle 190 for displacement therewith. The lowermost end of closure fastener 194 defines in an abutment surface 200. A generally cylindrical abutment collar or member 198 is slideably disposed upon pintle 190 intermediate sealing pad 188 and closure fastener 194. The uppermost surface of abutment member 198 defines a second abutment surface 202. The lowermost end of abutment member 198 rests upon the upper surface of sealing pad 188. A resilient, generally annular rubber sealing pad 196 is disposed intermediate closure fastener 194 and abutment member 198 and, when in the relaxed condition, has a nominal outside diameter approximately equal to the nominal inside diameter of tube 164. A series of passageways 204 in control rod 192 and abutment member 198 provide for free communication between the ID volume of tube 164 immediately adjacent end 166 and an internal bore 206 formed in control rod 192. A lower frame member 208 is affixed to the lower end of control rod 192. A compression spring 210 bares upwardly against the lowermost surface of frame 186 and downwardly against the uppermost surface of lower frame member 208 to continuously urge control rod 192 and pintle 190 downwardly as illustrated in FIG. 20.

In application, control rod 192 is pressed upwardly with respect to frame 186 thereby maximizing the spacing of abutment surfaces 202 and 200 wherein sealing pad 196 becomes relaxed and assumes its nominal minimal outside diameter. When spring 210 is allowed to press downwardly from its illustrated position, it draws pintle 190 downwardly thereby reducing the axially dimension between abutment surfaces 200 and 202, in turn squeezing or compressing sealing pad 196 and thereby momentarily increasing its nominal outside diameter. The lowermost open end of bore 206 is connected to a source of fluid pressure 212.

During the manufacturing process, frames 196 and 208 are axially squeezed together, compressing spring 210 to minimize the diameter of sealing pad 196. In this condition, the fixture 184 is inserted axially within a work piece 182 with sealing pad 196 slideably received within the bore of tube 164 slightly above tube end 166. The insertion of pintle 190 within tube 164 continues until the uppermost surface of sealing pad 188 abuts the lowermost surface of tube retainer 100. Frame 186 is then continuously urged upwardly by means not illustrated as indicated by arrow 214 to ensure that sealing pad 188 is maintained compressivley in intimate relationship with the lowermost portion of tube retainer 100 to establish an air tight seal therebetween. At that point, lower frame member 208 is released, permitting spring 210 to draw pintle 190 downwardly thereby compressing sealing pad 196. In application, sealing pad 196 will thus attempt to expend radially outwardly and establish a tight sealing relationship with the inner circumferential surface of tube 164. With the pressure check fixture 184 so installed, an annular sealed cavity 216 is defined by the inner diameter surface of tube end 166, the roll formed portion of skirt 176, sealing pad 188, abutment member 198 and sealing pad 196. Pressurized fluid enters through bore 206 and passageways 204 to momentarily pressurize cavity 216. Because the volume of cavity 216 is very small, the cycle times of this pressure checking process can be relatively short and not disruptive to the overall manufacturing cycle time.

By pressurize and hold techniques, the integrity of the seal between tube 164 and tube retainer 100 is verified. Thereafter, control rod 192 is pressed upwardly to release sealing pad 196 and the pressure check fixture 184 is axially downwardly removed.

Figure 21:
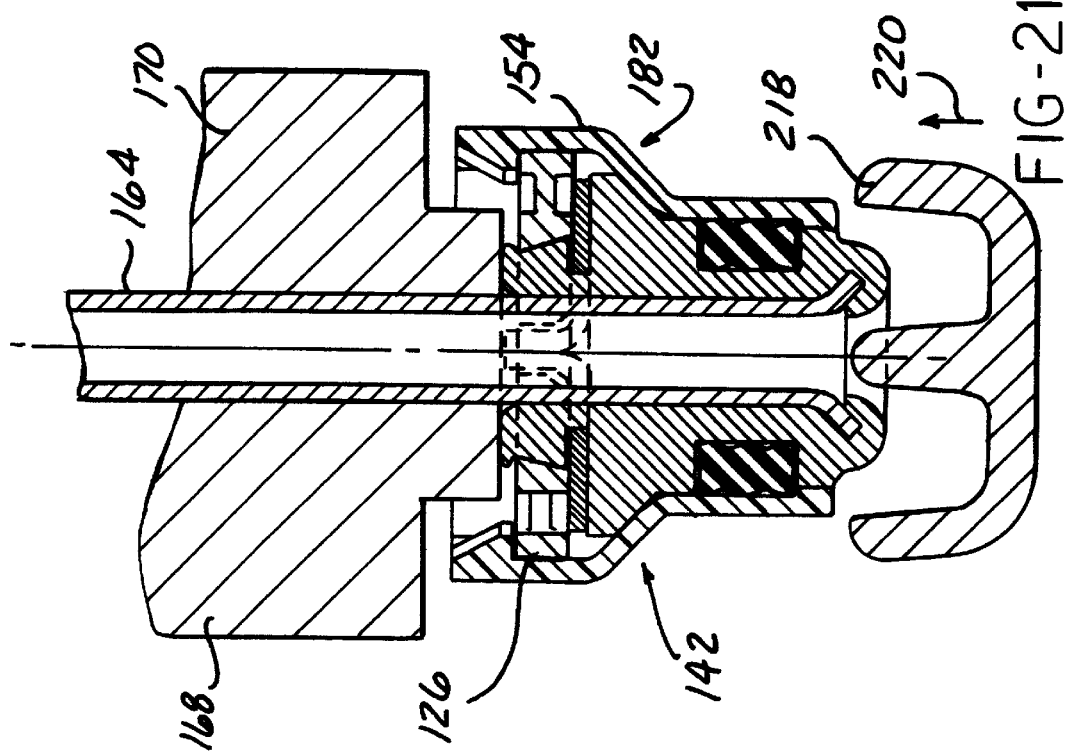

Referring to FIG. 21, as an optional final process step, a secondary end transport cover 218 is axially applied to the lowermost portion of assembly 182 as indicated by arrow 220. Cover 218 is generally cup-shaped and dimensioned to establish a snug slip-fit over the lowermost outer surface of transport cover 154. With the completion of this step, assembly of male quick connector assembly 182 is completed. The transport covers 154 and 218 as well as pop top 126 collectively enclose most of the peripheral surfaces of the male fitting body to minimize the risk of damage from mishandling as the assembly 182 is shipped to its final destination for installation in the host system. Lastly, dies 186 and 170 are released and assembly 182 is prepared for shipment.

Because pop top 126 and transport covers 154 and 218 are used temporarily as assembly and instillation aids and protective packaging, and are ultimately discarded after mating of the male fitting body 142 within its intended female high pressure quick connect subassembly such as shown in FIG. 1 with respect to the first described alternative embodiment of the present invention, transport covers 154 and 218 as well as pop top 126 are constructed of relatively inexpensive, pliable material, preferable that which can be recycled.

The assembly process described contemplates exclusively unidirectional assembly techniques to facilitate efficiency and minimal cycle times. The present invention is particularly advantageous because of the self-engaging features of the various components of the male fitting body which permit it to be sold as a separate product apart from its mating tube which can be added by a subsequent purchaser for various applications. The second embodiment described permits the use of a single flare at the end of the tube rather than a more complex and expensive SAE or ISO type flare as is now typical in the industry. Lastly, the use of separate delivery or transport covers permit having one cover 154 in place to protect the dimension critical and/or easily damaged components and surfaces while downstream processes are being implemented.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A male fitting body adapted for sealing interconnection with a tube end form for use in high pressure fluid quick connectors, said male fitting body comprising:

a tube retainer defining a central aperture for receiving a tube;

latching means in assembly with said tube retainer, said latching means resiliently radially displaceable between a radially outwardly expanded released position and a radially inwardly compressed, clasped position; and retainer means operative to maintain said latching means in said clasped position prior to installation of a tube in said central aperture;

said latching means in assembly with said retainer means prior to installation of a tube in said central aperture of said retainer.

2. The male fitting body of claim 1, further comprising means operative, in application, to establish sealing engagement with a female connector portion.

3. The male fitting body of claim 2, wherein said means operative to establish sealing engagement comprises a resilient means seal in assembly with said retainer prior to installation of a tube in said central aperture.

4. The male fitting body of claim 1, further comprising means deformable to permanently sealingly engage a tube end form within said aperture.

5. The male fitting body of claim 1, further comprising transport cover means operative to protectively overlay at least a portion of the outer peripheral surface of said tube retainer.

6. The male fitting body of claim 5, wherein said transport cover is operative to self-engage with said retainer means.

7. A male fitting body adapted for sealing interconnection with a tube end form for use in high pressure fluid quick connectors, said male fitting body comprising:

a tube retainer defining a central aperture for receiving a tube;

latching means in assembly with said tube retainer, said latching means resiliently displacable between a released position and a clasped position;

retainer means operative to maintain said latching means in said clasping position prior to installation of a tube in said central aperture;

transport cover means operative to protectively overlay at least a portion of the outer peripheral surface of said tube retainer; and an end cover operative to protectively overlay and close said central aperture.

8. The male fitting body of claim 1, wherein said retainer means is operative to self-engage with said tube retainer.

9. A method of constructing a male connector assembly for a high pressure quick connector comprising the steps of:

preassembling a male fitting body consisting of at least a tube retainer, a latch which is resiliently displaceable between a radially outwardly extending, expanded released position and a radially inwardly extending compressed, clasped position, and a retainer coupled with said latch and operative to maintain said latch in said clasped position; and subsequently affixing said male fitting body to the end of an elongated tube.

10. The method of claim 9, wherein the step of preassembling said male fitting body includes installation of a resilient seal on a peripheral surface of said tube retainer.

11. The method of claim 9, wherein the step of preassembling said male fitting body includes installation of a transport cover protectively overlaying at least a peripheral surface of said tube retainer.

12. The method of claim 9, wherein the step of affixing said fitting body to said tube includes permanently, sealingly affixing said tube retainer to said tube end.

13. The method of claim 12, wherein the step of affixing said fitting body to said tube includes plastically deforming said tube retainer to lockingly engage said tube end.

14. A method of constructing a male connector assembly for a high pressure quick connector comprising the steps of:

preassembling a male fitting body consisting of at least a tube retainer, a latch which is resiliently displacable between a released position and a clasped position, and a retainer operative to maintain said latch in said clasped position;

subsequently affixing said fitting body to the end of an elongated tube; and pressure testing a sealing interface between said tube and said tube retainer.

15. A method of constructing a male connector assembly for a high pressure quick connector comprising the steps of:

preassembling a male fitting body consisting of at least a tube retainer, a latch which is resiliently displacable between a released position and a clasped position, and a retainer operative to maintain said latch in said clasped position;

subsequently affixing said fitting body to the end of an elongated tube; and installing a protective end cover operative to close said tube end.

16. A method of constructing a male connector assembly for a high pressure quick connector comprising the steps of:

preassembling a male fitting body consisting of at least a tube retainer, a latch which is resiliently displacable between a expanded released position and a clasped position, and a retainer and operative to maintain said latch in said clasped position;

subsequently affixing said fitting body to the end of an elongated tube; and positioning the tube to extend entirely through a central aperture formed in said tube retainer and, thereafter, plastically expanding the end of the tube to create a tube end form.

17. The method of claim 16, further comprising the step of radially deforming a skirt portion of said tube retainer disposed generally concentrically with said central aperture to sealingly engage the expanded tube end.

* * * * *